March 6, 1951  J. H. LONG  2,543,787
DOUBLE MOTOR DRIVE SYNCHRONIZING SYSTEM
Filed Jan. 7, 1948
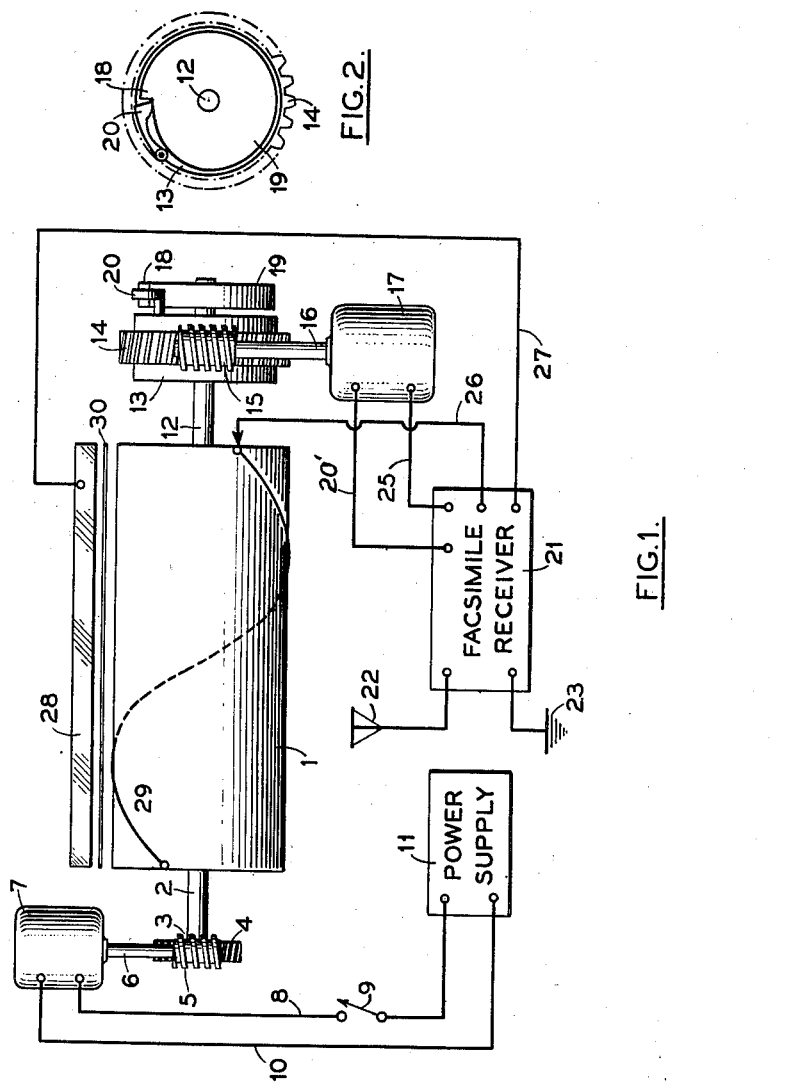
INVENTOR.
JOHN H. LONG
BY ATTORNEY
Alfred W. Barber Patented Mar. 6, 1951

2,543,787

UNITED STATES PATENT OFFICE 2,543,787

DOUBLE MOTOR DRIVE SYNCHRONIZING SYSTEM

John H. Long, Flushing, N. Y., assignor to Faximile, Inc., New York, N. Y., a corporation of Delaware Application January 7, 1948, Serial No. 879

7 Claims. (Cl. 178—69.5)

The present invention concerns facsimile systems and, in particular, motor driven and synchronizing devices for facsimile recorders and the like.

The term facsimile is generally applied to the process which includes the steps of, scanning a subject copy of graphic material, usually with a small spot of light, generating electrical signals representing density variations point by point of the subject copy, conveying these electrical signals to a distant point, and reproducing them as density changes on a record sheet to exactly represent the original copy. A recording point is utilized at the receiving end to scan the record sheet in synchronism with the scanning point of light which is utilized to cover the original copy. One well known method of producing the density variations in the record sheet is to pass the electrical current representing these variations through an electrolytically sensitive sheet which produces a color change which is a function of the instantaneous recording current. One type of recorder which is well suited to this purpose includes a rotatable drum carrying a helical electrode and driven by a motor in synchronism with the transmitter scanner motor and an intersecting linear electrode which is usually considered the stationary electrode while the record sheet is drawn at a steady rate between the two electrodes. In order to maintain synchronism between the recorder and the transmitter scanner it is usual to employ a synchronous motor either driven from a common source of alternating current or from a synchronized source under control of a transmitter signal. In general, this synchronous motor will have a shaft speed of 1800 or 3600 revolutions per minute while the drum carrying the helical electrode travels at a considerably lower speed, usually between 120 and 360 revolutions per minute. In order to drop the motor speed to the drum speed one or more gear sets must be used. The speed reduction often can be accomplished by means of a worm and worm gear in a single set. However, it has been found that a certain amount of backlash exists in practically all gearing systems which may cause successive scanning lines of the recorded copy to be displaced with respect to each other. The higher the required resolution and fineness of detail in the recorded copy the more apparent will be any backlash effects in the gearing system. According to the present invention two motors are used to drive the recording scanner in such a manner that the backlash is effectively eliminated.

In addition to maintaining a state of operation in which backlash is very effectively eliminated, a system using a non-synchronous motor to drive and a synchronous motor to control has added advantages.

An induction motor is more efficient in operation than a synchronous motor. Therefore, a small size induction motor will suffice to operate the system where a larger, more expensive synchronous would be required. In addition, if a portable, battery operated system is being used, the power drain on the battery becomes important. If a small induction motor is used to drive the system and a small synchronous motor used to control the system an appreciable saving is made in power drain. There is also an equipment saving in using a dual motor combination of this type. If the power is to be supplied solely from a synchronous motor, and the transmitter and recorder power systems are not in synchronism, a synchronizing system would be required at the recorder to supply the power requirements of the synchronous motor to drive the recorder drum. The power output of such a synchronizer would at least be of the order of fifty or sixty watts. If instead, an induction motor is used, battery or local power can be applied directly to it and a ten or fifteen watt synchronous motor can control the system resulting in a very large saving in power and in size, weight and cost of the equipment being used.

In operating a facsimile recorder the recording drum must be in synchronism and also in phase with the transmitting drum in order to have the copy centered with regard to the recording sheet. Once the phasing has been accomplished it is desirable to maintain it, even though the recording drum may be stopped during the recording process. This general situation also applies to the transmitter where it is desirable to maintain a constant phase condition even though the transmitter drum may be stopped to change the subject copy. According to the present invention a clutch arrangement is utilized in conjunction with two driving motors in such a way that either the recorder drum or the transmitter drum may be stopped during the transmission period and restarted without disturbing the phase condition in the system.

One object of the present invention is to eliminate jitter due to backlash in a facsimile scanner or recorder drum operation.

Another object of the present invention is to provide a system in which the scanning or recording drum may be stopped and restarted without disturbing synchronism or phasing in the system.

A further object is to provide a simple and effective single position clutch device for use in facsimile systems.

It is a still further object of the present invention to provide a system in which small light motors may be used to operate and control the synchronous rotation of a system, one motor being non-synchronous and supplying most of the required torque the other motor being synchronous and controlling the phasing and synchronism control of the system.

These and other objects of the present invention will be apparent from the detailed description of the invention given in conjunction with the various figures of the drawings.

In the drawings:

Fig. 1 shows a facsimile recorder according to the present invention.

Fig. 2 shows an end view of the clutch mechanism according to the present invention.

While the drawing shows a facsimile recorder, according to the present invention the method and means shown for maintaining phasing during stopping and restarting of the drum and for eliminating backlash in the gearing system apply equally to a transmitter scanner system in which, instead of a recorder drum, a transmitter scanner drum is utilized. The system is useful and important as applied to transmitters since it is desirable to transmit copy with a constant phase relation so that recorders being phased with signals from the system will not need to be rephased when the transmitter scanner is stopped and restarted. The elimination of backlash in the transmitter gearing is just as important as it is in the recorder.

Fig. 1 shows a facsimile recorder including a rotatable drum 1 carrying a helical electrode 29 which, in cooperation with a linear electrode 28, records upon a recording sheet 30 passed between the two electrodes by suitable paper advancing means not shown. Drum 1 has shaft extensions 2 on one end and 12 on the other. Recording signals are applied between helix 29 and linear electrode 28 over leads 26 and 27 from a suitable source such as facsimile receiver 21 connected to antenna 22 and ground 23. According to the present invention two motors are utilized to drive the drum 1. One of these motors is induction motor 7 and the other is synchronous motor 17. Induction motor 7, having shaft 6, drives drum 1 by means of worm gear 4 mounted on end 3 of shaft 2 and worm 5 mounted on shaft 6 of motor 7. Induction motor 7 is driven from a suitable power source such as power supply 11 over leads 8 and 10 and through switch 9 which is closed to energize the motor. Gears 4 and 5 are chosen to cause drum 1 to rotate at slightly above desired synchronous speeds when motor 7 operates at its normal speed. Synchronous motor 17 drives a collar 13 free to turn around shaft 12 through motor shaft 16 worm 15 and worm gear 14. Synchronous motor 17 receives synchronous alternating current from a suitable source which may be conveniently contained in facsimile receiver 21 and connected over wires 31 and 25. The ratio of worm 15 and worm gear 14 is chosen so that when synchronous motor 17 is operated at synchronous speed collar 13 rotates at a speed corresponding to the desired synchronous drum rotational speed. On the end of drum shaft 12 is mounted a cam 19. Pawl 20, carried by collar 13, engages cam 19, operating against shoulder 18. The direction of rotation in the system is such that as motor 7 rotates drum 1 and tries to bring it above synchronous speed pawl 20 engages shoulder 18 preventing the drum from rotating at a speed greater than the speed of rotation of collar 13. Thus, although motor 7 tends to drive the drum at higher than synchronous speed, the engagement of pawl 20 with cam 19 holds the drum speed to the desired synchronous speed as determined by the speed of rotation of collar 13. Figure 2 shows the details of cam 19, pawl 20, and shoulder 18.

Drum 1 may be stopped by opening switch 9 allowing motor 7 to stop, which removes the driving power. Since pawl 20 will then slip over shoulder 18 drum 1 will stop although motor 17 maintains collar 13 in synchronous speed and constant phase relation. When it is again desired to start drum 1, switch 9 is closed and motor 7 brings drum 1 up to synchronous speed where the synchronous driving system is again engaged. When drum 1 comes up to synchronous speed and shoulder 18 of cam 19 engages pawl 20, the phase relation originally established is again provided and recording can continue without rephasing the system. Since motor 7 tends to drive drum 1 at greater than synchronous speed gears 4 and 5 and also 14 and 15 are normally loaded in the same direction, thus eliminating backlash and consequent jitters in the system.

It will be noted that worm gear 14 and worm 15 have a disadvantageous energy transmission characteristic in the direction toward the synchronous motor 17. Therefore when induction motor 7 tries to drive drum 1, cam 19, collar 13 and worm gear 14 faster than the speed imparted to the worm gear by the synchronous motor 17, a relatively small amount of the energy from the induction motor 7 is actually transmitted through the gears to the synchronous motor. By this construction a small synchronous motor is adequate for holding the speed of drum 1 down to synchronous speed.

While only a single embodiment of the present invention has been shown and described, many modifications will be apparent to those skilled in the art within the scope of the invention and set forth in the appended claims.

What is claimed is:

1. In a facsimile system, the combination of: a rotatable device to be rotated at a predetermined synchronous speed, a non-synchronous motor coupled to said device tending to rotate it at greater than synchronous speed, a synchronous motor for holding the speed of said device down to synchronous speed, and unidirectional mechanical coupling means engaging said rotatable device with said synchronous motor only when said device is rotated as fast as synchronous speed determined by the synchronous motor.

2. The combination of claim 1 wherein said coupling means comprises a pawl and cam.

3. In a facsimile system, the combination of: a rotatable device to be rotated at a predetermined synchronous speed, a non-synchronous motor coupled to said device tending to rotate it at greater than synchronous speed, a synchronous motor for holding the speed of said device down to synchronous speed, and mechanical coupling means between said rotatable device and said synchronous motor permitting rotation of said device at speeds less than but not greater than synchronous speed.

4. The combination of claim 3 wherein said coupling means includes, in series, a set of gears and a phasing cam and pawl.

5. The combination of claim 3 wherein said coupling means includes, in series, means having disadvantageous energy transmission characteristics in the direction toward the synchronous motor, and unidirectional means decoupling said rotatable device when its speed is less than synchronous speed.

6. The combination of claim 3 wherein said coupling means includes, in series, means having disadvantageous energy transmission characteristics in the direction toward the synchronous motor, and phasing means fixing the angular relationship of the rotatable device relative to the synchronous motor when the non-synchronous motor tends to drive said device at above-synchronous speed.

7. In a facsimile system, the combination of a drum to be rotated at a predetermined synchronous speed, a non-synchronous motor coupled to the drum tending to rotate it at greater than synchronous speed, a source of synchronizing alternating-current power, a synchronous motor receptive to said power, and unidirectional mechanical coupling means between the drum and the synchronous motor effective in the direction from the drum to the synchronous motor, said coupling means including, in series, gears having a disadvantageous energy transmission characteristic in the direction toward the synchronous motor, and cam and pawl means fixing the angular relationship of the drum relative to the synchronous motor when the non-synchronous motor tends to drive the drum at a speed greater than the predetermined synchronous speed, whereby the drum will automatically return to synchronous and in-phase rotation after being stopped for operating purposes.

JOHN H. LONG.

REFERENCES CITED

The following references are of record in the file of this patent:

UNITED STATES PATENTS

| Number | Name | Date |
| --- | --- | --- |
| 2,098,802 | Finch | Nov. 9, 1937 |
| 2,105,897 | Toune | Jan. 18, 1938 |
| 2,182,000 | Nichols | Dec. 5, 1939 |
| 2,280,688 | Cooley | Apr. 21, 1942 |
| 2,404,571 | Finch | July 23, 1946 |
| 2,428,946 | Somers | Oct. 14, 1947 |